US007035908B1

(12) United States Patent
Williams et al.

(10) Patent No.: US 7,035,908 B1
(45) Date of Patent: Apr. 25, 2006

(54) METHOD FOR MULTIPROCESSOR COMMUNICATION WITHIN A SHARED MEMORY ARCHITECTURE

(75) Inventors: Kalvin E. Williams, Thatcham (GB); John S. Holcroft, Woking (GB); Christopher J. Lane, Reading (GB)

(73) Assignee: LSI Logic Corporation, Milpitas, CA (US)

( * ) Notice: Subject to any disclaimer, the term of this patent is extended or adjusted under 35 U.S.C. 154(b) by 476 days.

(21) Appl. No.: 09/915,833

(22) Filed: Jul. 26, 2001

(51) Int. Cl.
*G06F 15/167* (2006.01)
*G06F 12/00* (2006.01)

(52) U.S. Cl. .................. 709/214; 711/147; 711/153; 711/169; 709/201; 710/22; 710/40; 710/44; 718/100; 718/107

(58) Field of Classification Search ........ 719/312–314; 712/32–43, 203, 246–248; 711/118–169; 710/100–317, 22, 40, 44; 700/5; 709/200, 709/201, 214, 225; 718/100, 101, 103, 107
See application file for complete search history.

(56) References Cited

U.S. PATENT DOCUMENTS

| 4,056,844 | A | * | 11/1977 | Izumi | 711/117 |
| 4,073,005 | A | * | 2/1978 | Parkin | 718/104 |
| 4,313,161 | A | * | 1/1982 | Hardin et al. | 711/151 |
| 4,345,309 | A | * | 8/1982 | Arulpragasam et al. | 711/140 |
| 4,410,944 | A | * | 10/1983 | Kronies | 711/147 |
| 4,445,174 | A | * | 4/1984 | Fletcher | 711/121 |
| 4,862,350 | A | * | 8/1989 | Orr et al. | 709/213 |
| 5,191,649 | A | * | 3/1993 | Cadambi et al. | 709/225 |
| 5,327,570 | A | * | 7/1994 | Foster et al. | 712/30 |
| 5,428,766 | A | * | 6/1995 | Seaman | 709/215 |
| 5,535,116 | A | * | 7/1996 | Gupta et al. | 700/5 |
| 5,617,537 | A | * | 4/1997 | Yamada et al. | 709/214 |
| 5,790,530 | A | * | 8/1998 | Moh et al. | 370/363 |
| 5,796,605 | A | * | 8/1998 | Hagersten | 700/5 |
| 5,802,288 | A | * | 9/1998 | Ekanadham et al. | 709/250 |
| 5,905,998 | A | * | 5/1999 | Ebrahim et al. | 711/144 |
| 5,968,134 | A | * | 10/1999 | Putzolu et al. | 709/238 |
| 6,226,706 | B1 | * | 5/2001 | Kim | 710/316 |
| 6,253,291 | B1 | * | 6/2001 | Pong et al. | 711/146 |
| 6,647,450 | B1 | * | 11/2003 | Kaplinsky | 710/300 |
| 6,697,919 | B1 | * | 2/2004 | Gharachorloo et al. | 711/141 |
| 6,813,522 | B1 | * | 11/2004 | Schwarm et al. | 700/5 |
| 6,823,472 | B1 | * | 11/2004 | DeKoning et al. | 714/10 |
| 2002/0007443 | A1 | * | 1/2002 | Gharachorloo et al. | 711/141 |
| 2002/0165896 | A1 | * | 11/2002 | Kim | 709/102 |
| 2002/0166008 | A1 | * | 11/2002 | Tanaka et al. | 710/56 |

FOREIGN PATENT DOCUMENTS

EP 1081597 A1 * 7/2001

OTHER PUBLICATIONS

Aschmann et al., "Alphorn: A Remote Procedure Call Environment for Fault-Tolerant, Heterogeneous, Distributed Systems " IEEE Micro, Oct. 11, 1991, No. 5, Los Alamitos, CA.*

Rhee, Injong, "Optimizing a FIFO, Scalable Spin Lock Using Consistent Memory", IEEE 1052-8725/96, pp. 106-114, 1996.*

* cited by examiner

*Primary Examiner*—Majid Banankhah
(74) *Attorney, Agent, or Firm*—Christopher P. Maiorana PC

(57) ABSTRACT

An apparatus comprising a shared memory and a multiprocessor logic circuit. The shared memory may be configured to store data. The multiprocessor logic circuit may comprise a plurality of processors and a message circuit. The message circuit may be configured to pass messages between the processors.

16 Claims, 4 Drawing Sheets

METHOD FOR MULTIPROCESSOR COMMUNICATION WITHIN A SHARED MEMORY ARCHITECTURE

FIELD OF THE INVENTION

The present invention relates to a method and/or architecture for multiprocessor communication generally and, more particularly, to a method and/or architecture for implementing interprocessor communication within a multiprocessor system on a single chip incorporating a shared memory architecture.

BACKGROUND OF THE INVENTION

Conventional shared memory architectures implement a single system processor (or CPU). Such conventional architectures are not configured to perform multiprocessor communication or high speed multiprocessor system software partitioning.

It is generally desirable to provide a method and/or architecture that provides multiple processors to enable parallel execution of software, cleaner partitioning of system software and/or increased efficiency of system bandwidth.

SUMMARY OF THE INVENTION

The present invention concerns an apparatus comprising a shared memory and a multiprocessor logic circuit. The shared memory may be configured to store data. The multiprocessor logic circuit may comprise a plurality of processors and a message circuit. The message circuit may be configured to pass messages between the processors.

The objects, features and advantages of the present invention include providing a method and/or architecture for implementing interprocessor communication within a multiprocessor system on a single chip incorporating a shared memory architecture that may (i) implement a dedicated hardware device for message passing between multiple system processors, (ii) implement a memory device for command passing, (iii) add commands with normal priority (e.g., added to an end of the queue) or urgent priority (e.g., added as near to a front of the queue as possible), (iv) provide an ordered command queue, (v) read from a single address, (vi) automatically generate commands whenever command data is within the queue or if a command posting has failed, (vii) read commands individually or within batches depending on system requirements, (viii) provide rapid interprocessor command passing and/or (ix) pass commands of non-fixed size.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
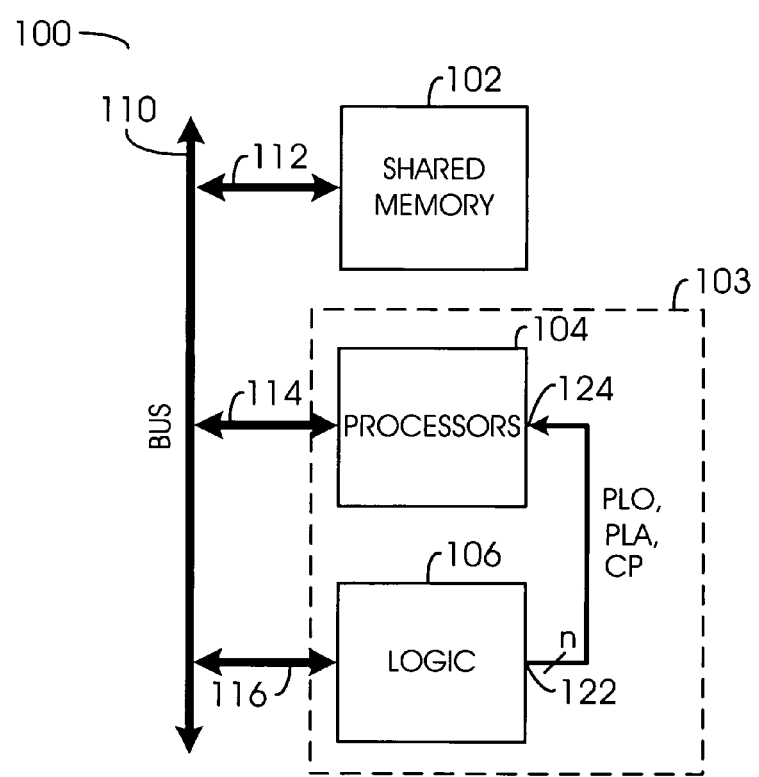
FIG. 1 is a block diagram of a preferred embodiment of the present invention.

Referring to FIG. 1, a block diagram of a circuit (or system) 100 is shown in accordance with a preferred embodiment of the present invention. The circuit 100 may provide an interprocessor communication within a multiprocessor design incorporating a shared memory architecture. The circuit 100 may be implemented as a unidirectional interprocessor communication scheme. The circuit 100 may also utilize a message pipe-line queue scheme. In one example, the circuit 100 may be implemented as a single chip or integrated circuit (IC). The circuit 100 may implement at least two general purpose CPUs that may require high speed communication in order to enable system software partitioning. The CPUs may or may not fall within the traditional classification of a parallel processor architecture.

The circuit 100 may employ a dedicated first-in-first-out (FIFO) block to provide orderly unidirectional message passing between microprocessors (via a message pipeline FIFO to be discussed in connection with FIG. 2). However, the circuit 100 may also be configured to provide a bi-directional message passing scheme. The circuit 100 may be configured to provide a multiprocessor architecture that may enable parallel execution of software, cleaner partitioning of system software and measured efficiency of system bandwidth.

The circuit 100 generally comprises a memory 102 and a multiprocessor logic block (or circuit) 103. The multiprocessor logic block 103 generally comprises a processors block (or circuit) 104 and a logic block (or circuit) 106. The memory 102 may be connected to a bus 110 through an I/O bus 112. The processors circuit 104 may be connected to the bus 110 through an I/O bus 114. The logic block 106 may be connected to the bus 110 through an I/O bus 116. The logic block 106 may have an output 122 that may present a number of signals (e.g., PLO, PLA, and CP) to an input 124 of the processors block 104. The signal PLO may be implemented as a pipe-line overflow signal. The signal PLA may be implemented as a pipe-line available signal. The signal CP may be implemented as a command pending signal. The signals PLO, PLA and CP of the present invention may be implemented as interrupt signals. However, the signals PLO, PLA and CP may be implemented as other type signals in order to meet the criteria of a particular implementation.

Figure 2:
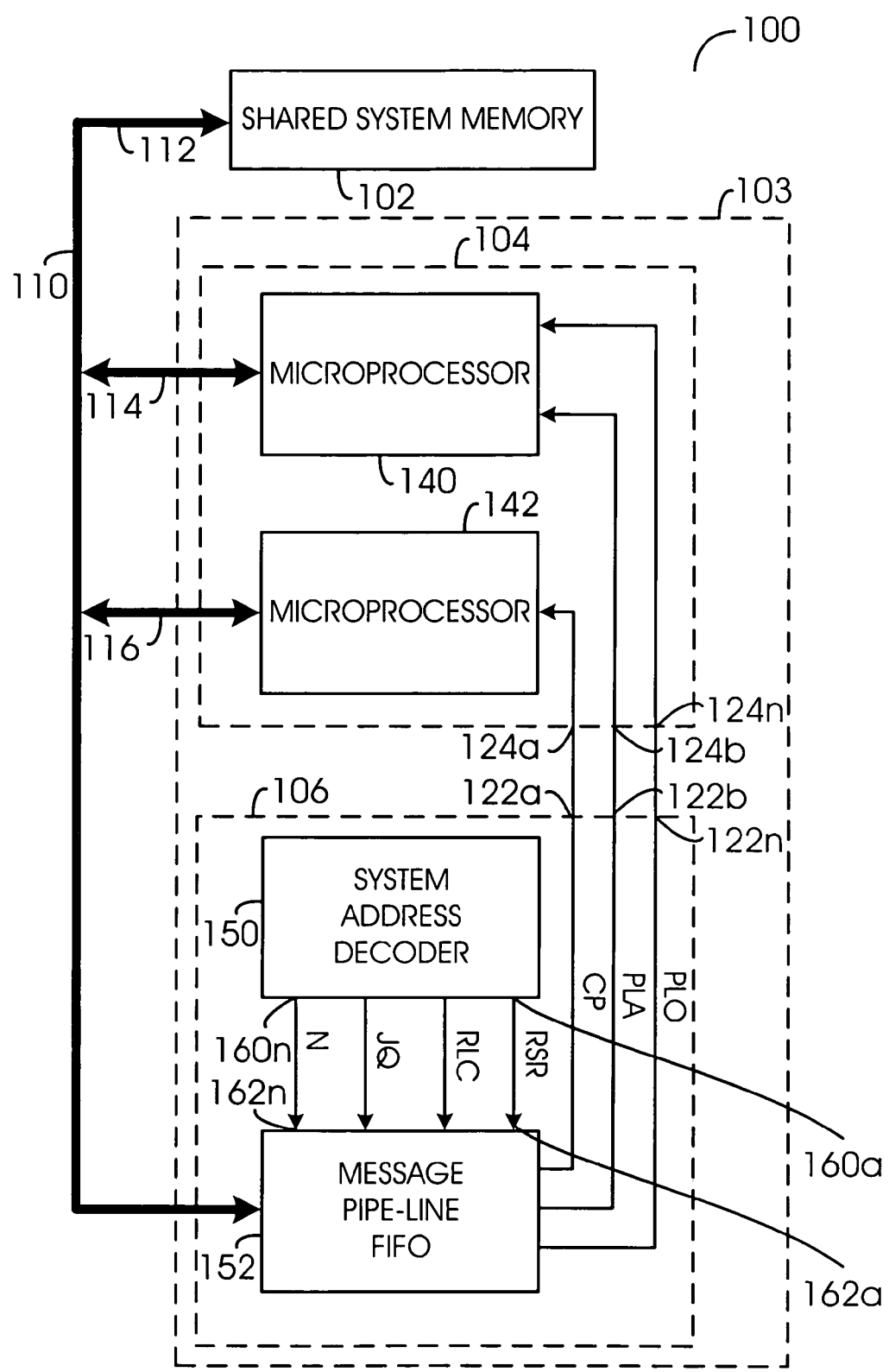
FIG. 2 is a detailed block diagram of the circuit of FIG. 1.

Referring to FIG. 2, a more detailed diagram of the system 100 is shown. The circuit 104 is shown implemented as a microprocessor 140 and a microprocessor 142. While the processors circuit 104 is shown as two microprocessors, the particular number of microprocessors may be varied accordingly to meet the design criteria of a particular implementation. The logic circuit 106 is shown implemented as a block (or circuit) 150 and a block (or circuit) 152. The circuit 150 may be a system address decoder. In one example, the circuit 152 may be a message circuit. In another example, the circuit 152 may be implemented as a message pipe-line FIFO. However, the circuit 152 may be implemented as other appropriate type queuing devices in order to meet the criteria of a particular implementation.

The system address decoder 150 may have a number of outputs 160a–160n that may present a number of signals (e.g., RSR, RLC, JQ and N) to a number of inputs 162a–162n of the FIFO 152. The signal RSR may be implemented as a read system register signal. The signal RLC may be implemented as a read leading command signal. The signal JQ may be implemented as a jump queue signal. The signal N may be implemented as a normal operation signal. The system address decoder 150 may generate the signals RSR, RLC, JQ and N in response to a decoded address (not shown). The signals RSR, RLC, JQ and N may control an operation of the FIFO 152.

The FIFO 152 may be configured to generate the signals PLO, PLA and CP. The signals PLO, PLA and CP may indicate a state of the FIFO 152. The microprocessor 140 may receive the signals PLO and PLA. The microprocessor 142 may receive the signal CP. The microprocessor 140, the microprocessor 142 and the FIFO 152 may be coupled to the bus 110. Therefore, the microprocessors 140 and 142 and the FIFO 152 may perform high speed communication.

Figure 3:
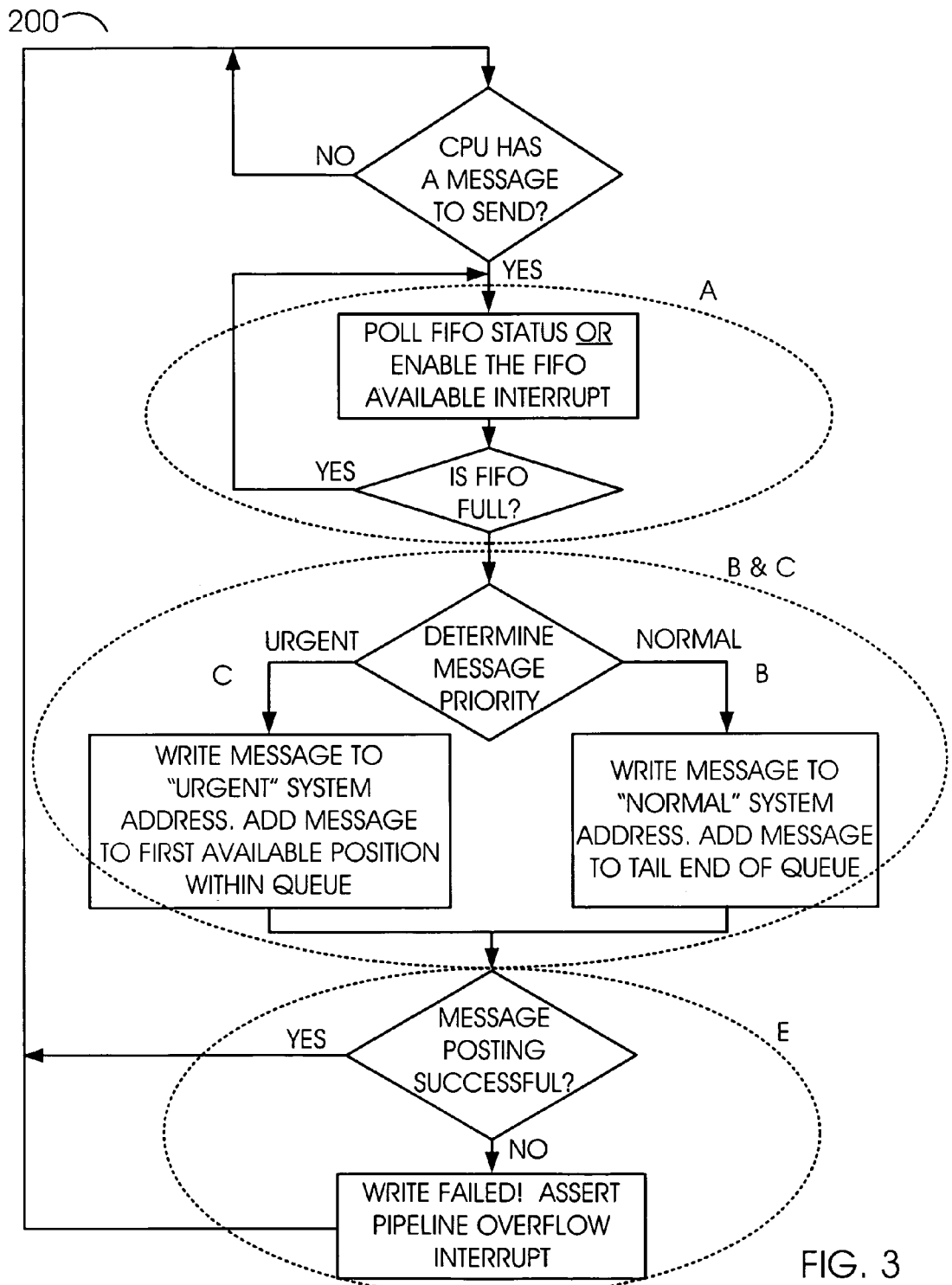
FIG. 3 is a flow chart illustrating an operation of the present invention.
Figure 4:
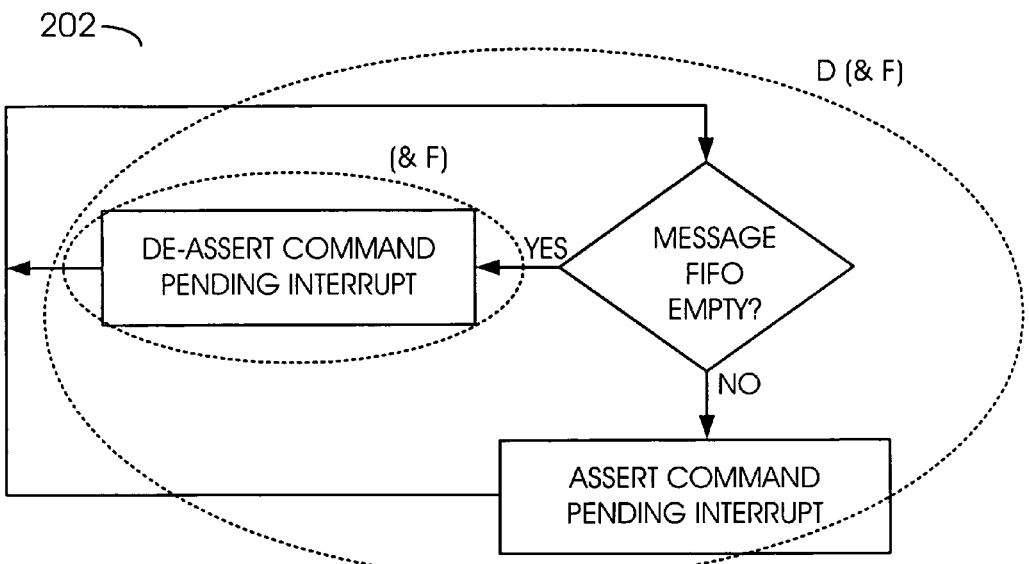
FIG. 4 is a flow chart illustrating an operation of the present invention.
Figure 5:
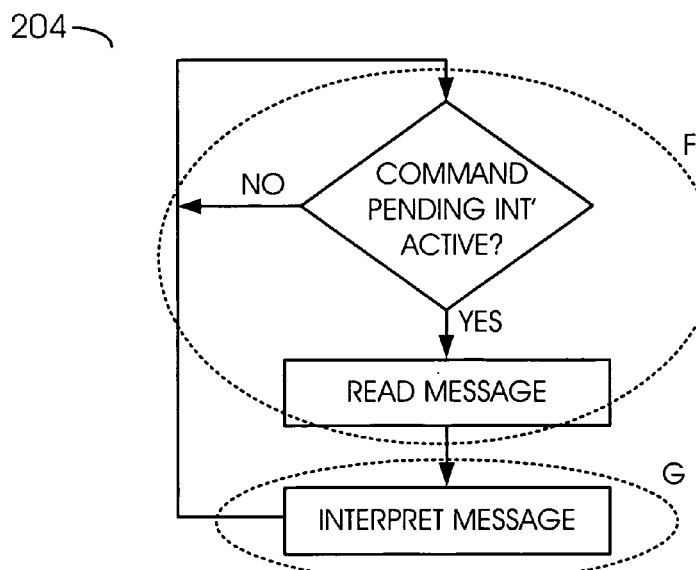
FIG. 5 is a flow chart illustrating an operation of the present invention.

Referring to FIGS. 3–5, a number of concurrent methods (or processes) are shown. FIG. 3 illustrates a message transmission process 200. FIG. 4 illustrates a queue management process 202. FIG. 5 illustrates a message reception process 204. The processes 200, 202 and 204 may be simultaneously discussed in order of functionality. The process 200 may comprise a state (e.g., A), a state (e.g., B), a state (e.g., C) and a state (e.g., E). The process 202 may comprise a state (e.g., D) and a state (e.g., F). The process 204 may comprise a state (e.g., F) and a state (e.g., G). The states A–G may operate concurrently and will be described in order of operation.

At the state A, the microprocessor 140 may check for available message space within the message pipe-line FIFO 150 by reading a system register. If space is available for an additional message, the CPU 140 may progress to the states B and C. If there is insufficient space within the FIFO 152 for additional messages, then the CPU 140 generally either (i) repeatedly polls the FIFO 152 for status information, until space becomes available, and then progress to the states B and C or (ii) enables the FIFO available interrupt (e.g., PLA) and continues other operations until the FIFO 152 becomes free. The CPU 140 may then progress to the states B and C.

At the state B, the CPU 140 may write a message to a system address, within the message pipe-line FIFO 152. Such an operation may have a NORMAL status as decoded by the address decoder 150. The message may then be added as a last entry within the message pipe-line FIFO 152. Within the system 100, a message may be a specific system command or an address pointer to a more complex system command stored within the shared memory 102. If all the addresses within a system memory map are not available for command passing, then the redundant bits (from a system address perspective) of the message may be used to indicate if the message is a command or command pointer.

At the state C, messages of URGENT status may be added to the FIFO 152 by writing to a second system address, within the message pipe-line 152, which may be decoded as a jump queue JQ. In such a case, the message may be inserted either behind the last urgent message sent to the pipe-line FIFO 152 (which is still pending) or to the front of the FIFO 152 if there is no other urgent message pending.

At the state D, if there is a message pending within the queue 152, then the command pending interrupt CP may be active. At the state E, if a message is written to the FIFO 152 when full, then the write may fail (e.g., the data written is discarded) and the pipe-line overflow interrupt PLO may be asserted. The CPU 140 may then be required to clear the interrupt PLO (via a system write) when responding to such an error condition.

At the state F, upon detection of the command pending interrupt CP, the microprocessor 142 may read the lead item from the message queue 152. If the lead item is the only entry within the FIFO 152, then the command pending interrupt CP may be automatically cleared, otherwise the interrupt CP may remain active.

At the state G, once read the CPU 142 may interpret the message as an actual command or as an address pointer to the command (within the shared memory 102). If the message is a pointer to a command, the CPU 142 may then mark the shared memory 102 as available again.

The circuit 100 may provide a message pipe-line (via the FIFO 152) configuration for command passing from the microprocessor 140 to the microprocessor 142. A similar configuration may be implemented for passing commands from the microprocessor 142 to the microprocessor 140. However, the corresponding command pending and pipe-line overflow interrupts may be swapped.

The circuit 100 may be implemented as a unidirectional message passing configuration. However, the circuit 100 may be implemented as a bi-directional message passing scheme. In particular, the circuit 100 may require a number of message FIFO queues 152. The particular number of message FIFO queues 152 may be proportional to the number of processors. Furthermore, the system address decoder 150 may be expanded to provide a set of control signals (e.g., the signals N, JQ, RLC and RSR) for each of the message FIFOs 152.

Alternatively, the multiprocessor split memory architecture 100 may increase/decrease the width and/or depth of the message pipeline FIFO 152 in order to meet the criteria of a particular implementation. For example, the message pipeline FIFO 152 may be configured to pass entire commands rather than a command pointer.

The circuit 100 may provide a dedicated hardware device for message passing between multiple system processors. The circuit 100 may also provide a memory (e.g., a FIFO) to perform orderly command passing and operate from a single address. The circuit 100 may add commands with normal priority (add to an end of the queue) or urgent priority (add as near to a front of the queue as possible). The circuit 100 may automatically generate interrupts when command data is within the queue or if a command posting has failed. The circuit 100 may also read commands individually or within batches depending on system requirements. Additionally, the circuit 100 may provide rapid interprocessor command passing of non-fixed size.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a system bus;
   a shared memory (i) coupled to said system bus and (ii) configured to store data; and
   a multiprocessor logic circuit comprising (i) a plurality of processors and (ii) a message circuit comprising a message pipe-line FIFO, wherein (a) said message circuit is directly connected to said system bus and configured to pass messages between said plurality of processors, (b) each of said plurality of processors is directly connected to said system bus and configured to access said shared memory and said message circuit through said system bus and (c) said message circuit is further configured to add commands written to a first address with normal priority levels and add commands written to a second address with urgent priority levels.

2. The apparatus according to claim 1, wherein said message circuit comprises a dedicated messaging circuit.

3. The apparatus according to claim 1, wherein said message circuit is further configured to provide bi-directional orderly command passing.

4. The apparatus according to claim 1, wherein said message circuit is further configured to generate one or more control signals configured to control an operation of said plurality of processors.

5. The apparatus according to claim 4, wherein said control signals comprise signals selected from the group consisting of (i) pipe-line overflow signals, (ii) pipe-line available signals, and (iii) command pending signals.

6. The apparatus according to claim 1, wherein said multiprocessor logic circuit further comprises:
an address decoder configured to decode a system address and control said message circuit.

7. The apparatus according to claim 1, wherein said apparatus provides a multiprocessor communication and shared memory architecture.

8. The apparatus according to claim 1, wherein:
said multiprocessor logic block further comprises an address decoder configured to generate one or more first control signals configured to control said message circuit; and
said message circuit is configured to generate one or more second control signals configured to control said processors.

9. A method for multiprocessor communication with a shared memory, comprising the steps of:
(A) storing data with said shared memory;
(B) processing data with a plurality of processors;
(C) passing messages between said processors with a message circuit, wherein (i) said message circuit comprises a message pipe-line FIFO, (ii) each of said plurality of processors and said message circuit are directly connected to a system bus, and (iii) each of said plurality of processors is configured to access said shared memory and said message circuit through said system bus; and
(D) adding commands (i) written to a first address with normal priority levels and (ii) written to a second address with urgent priority levels.

10. The method according to claim 9, wherein step (C) further comprises:
providing bi-directional orderly command passing.

11. The method according to claim 10, wherein step (C) further comprises:
generating one or more control signals, said control signals configured to control an operation of said processors.

12. The method according to claim 11, wherein said control signals comprise signals selected from the group consisting of: (i) pipe-line overflow signals, (ii) pipe-line available signals, and (iii) command pending signals.

13. The method according to claim 9, wherein:
said adding commands with normal priority levels further comprises adding commands to an end of a message queue; and
said adding commands with urgent priority levels further comprises adding commands near to a front of said message queue.

14. The method according to claim 9, wherein step (C) further comprises:
decoding a system address.

15. The method according to claim 14, wherein step (C) further comprises:
controlling said messages in response to said decoded system address.

16. An apparatus comprising:
a system bus;
a shared memory (i) coupled to said system bus and (ii) configured to store data; and
a multiprocessor logic circuit comprising (i) a plurality of processors and (ii) a message circuit comprising a message pipe-line FIFO, wherein (a) said message circuit is directly connected to said system bus and configured to pass messages between said plurality of processors, (b) each of said plurality of processors is directly connected to said system bus and configured to access said shared memory and said message circuit through said system bus, (c) said message circuit is further configured to generate one or more control signals configured to control an operation of said plurality of processors, and (d) said control signals comprise signals selected from the group consisting of (i) pipe-line overflow signals, (ii) pipe-line available signals, and (iii) command pending signals.

* * * * *